(12) United States Patent
Higashi et al.

(10) Patent No.: US 9,901,871 B2
(45) Date of Patent: Feb. 27, 2018

(54) SYSTEM FOR CHEMICALLY ABSORBING CARBON DIOXIDE IN COMBUSTION EXHAUST GAS

(71) Applicant: BABCOCK-HITACHI KABUSHIKI KAISHA, Tokyo (JP)

(72) Inventors: Hideaki Higashi, Hiroshima (JP); Jun Shimamura, Hiroshima (JP); Kazuki Kobayashi, Hiroshima (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 354 days.

(21) Appl. No.: 14/382,947

(22) PCT Filed: Feb. 27, 2013

(86) PCT No.: PCT/JP2013/001190
§ 371 (c)(1),
(2) Date: Sep. 4, 2014

(87) PCT Pub. No.: WO2013/132789
PCT Pub. Date: Sep. 12, 2013

(65) Prior Publication Data
US 2015/0030516 A1    Jan. 29, 2015

(30) Foreign Application Priority Data
Mar. 5, 2012 (JP) .................. 2012-047958

(51) Int. Cl.
*B01D 53/62* (2006.01)
*B01D 53/14* (2006.01)

(52) U.S. Cl.
CPC ......... *B01D 53/62* (2013.01); *B01D 53/1425* (2013.01); *B01D 53/1475* (2013.01);
(Continued)

(58) Field of Classification Search
CPC ...... B01D 2252/20478; B01D 2259/65; B01D 53/1425; B01D 53/1475; B01D 53/62; Y02C 10/04; Y02C 10/06
See application file for complete search history.

(56) References Cited

U.S. PATENT DOCUMENTS

| | | | | |
|---|---|---|---|---|
| 3,268,420 A | * | 8/1966 | Webber | ............... B01D 3/4238 202/160 |
| 4,035,166 A | * | 7/1977 | Van Hecke | ........ B01D 53/1456 423/232 |
| 2010/0229723 A1 | * | 9/2010 | Gelowitz | ........... B01D 53/1425 95/162 |

FOREIGN PATENT DOCUMENTS

| | | |
|---|---|---|
| JP | 2009-179546 A | 8/2009 |
| JP | 2012-000538 A | 1/2012 |

(Continued)

OTHER PUBLICATIONS

International Search Report of International Application No. PCT/JP2013/001190 dated May 14, 2013, 7 pages.

*Primary Examiner* — Cabrena Holecek
(74) *Attorney, Agent, or Firm* — Fay Sharpe LLP

(57) ABSTRACT

A carbon dioxide ($CO_2$) chemical absorption system comprising: a $CO_2$ absorption column for separating $CO_2$ from combustion exhaust gas by absorbing the $CO_2$ in the combustion exhaust gas with a $CO_2$ absorbing liquid mainly composed of an aqueous alkanolamine solution; a regeneration column for regenerating the $CO_2$ absorbing liquid by desorbing $CO_2$ gas from the $CO_2$ absorbing liquid that has absorbed $CO_2$; a condenser for condensing water vapor entrained in the desorbed $CO_2$ gas discharged from the top of the regeneration column, thereby obtaining reflux water; a pipe for returning all or part of the reflux water obtained by the condenser to the top of the regeneration column, and dispersing the reflux water in the regeneration column; a (Continued)

collection plate for collecting the reflux water dispersed in an upper portion of a packed bed in the regeneration column; a pipe for sending the regenerated $CO_2$ absorbing liquid from the bottom of the regeneration column to the top of the absorption column; and a pipe for joining the reflux water collected by the collection plate into the pipe for sending the regenerated $CO_2$ absorbing liquid.

2 Claims, 3 Drawing Sheets

(52) U.S. Cl.
CPC .............. *B01D 2252/20478* (2013.01); *B01D 2259/65* (2013.01); *Y02C 10/04* (2013.01); *Y02C 10/06* (2013.01)

(56) References Cited

FOREIGN PATENT DOCUMENTS

| JP | 2012-011333 | * | 1/2012 | ............. Y02C 10/04 |
| JP | 2012-011333 A | | 1/2012 | |

* cited by examiner

[FIG. 1]
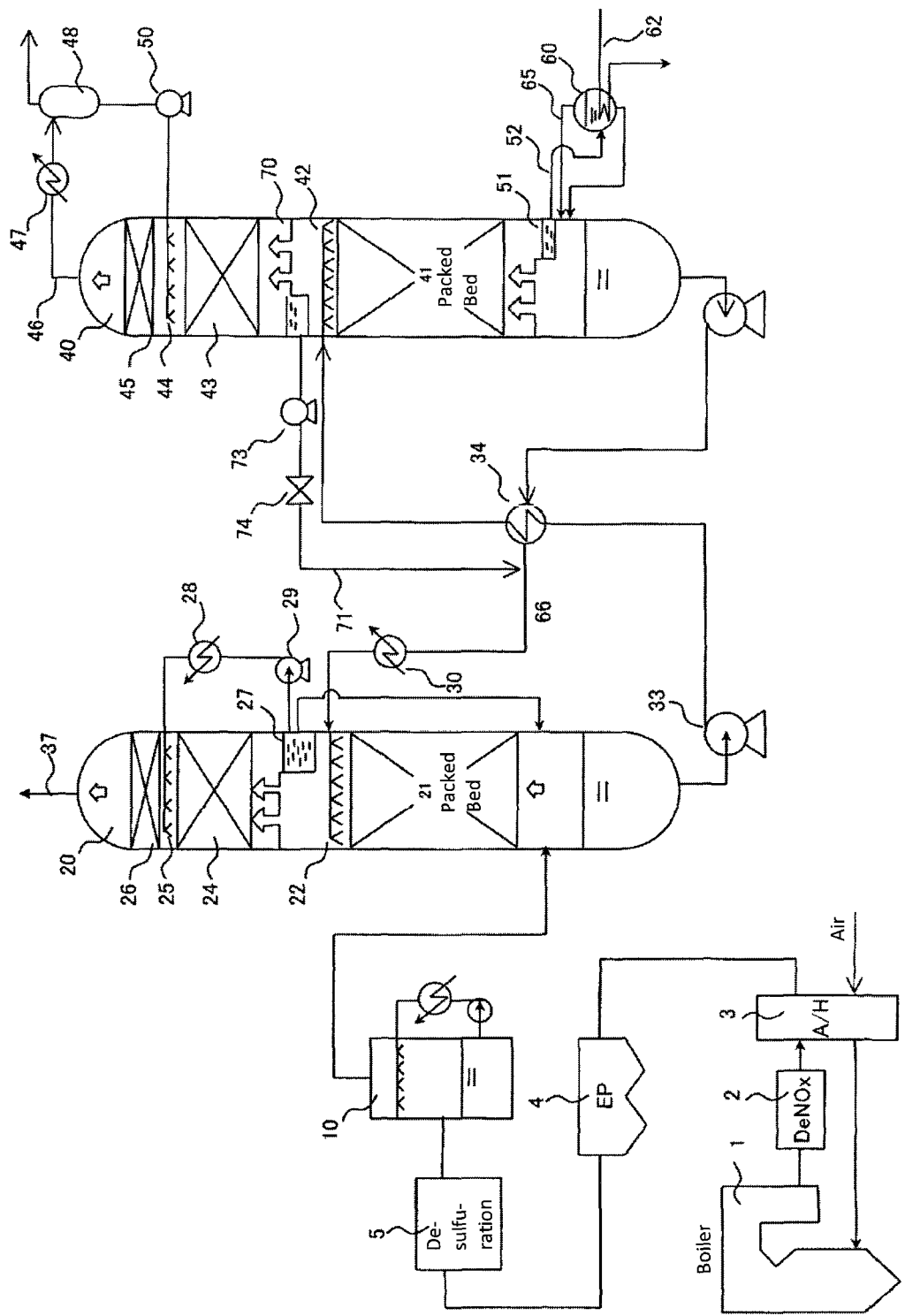

[FIG. 2]
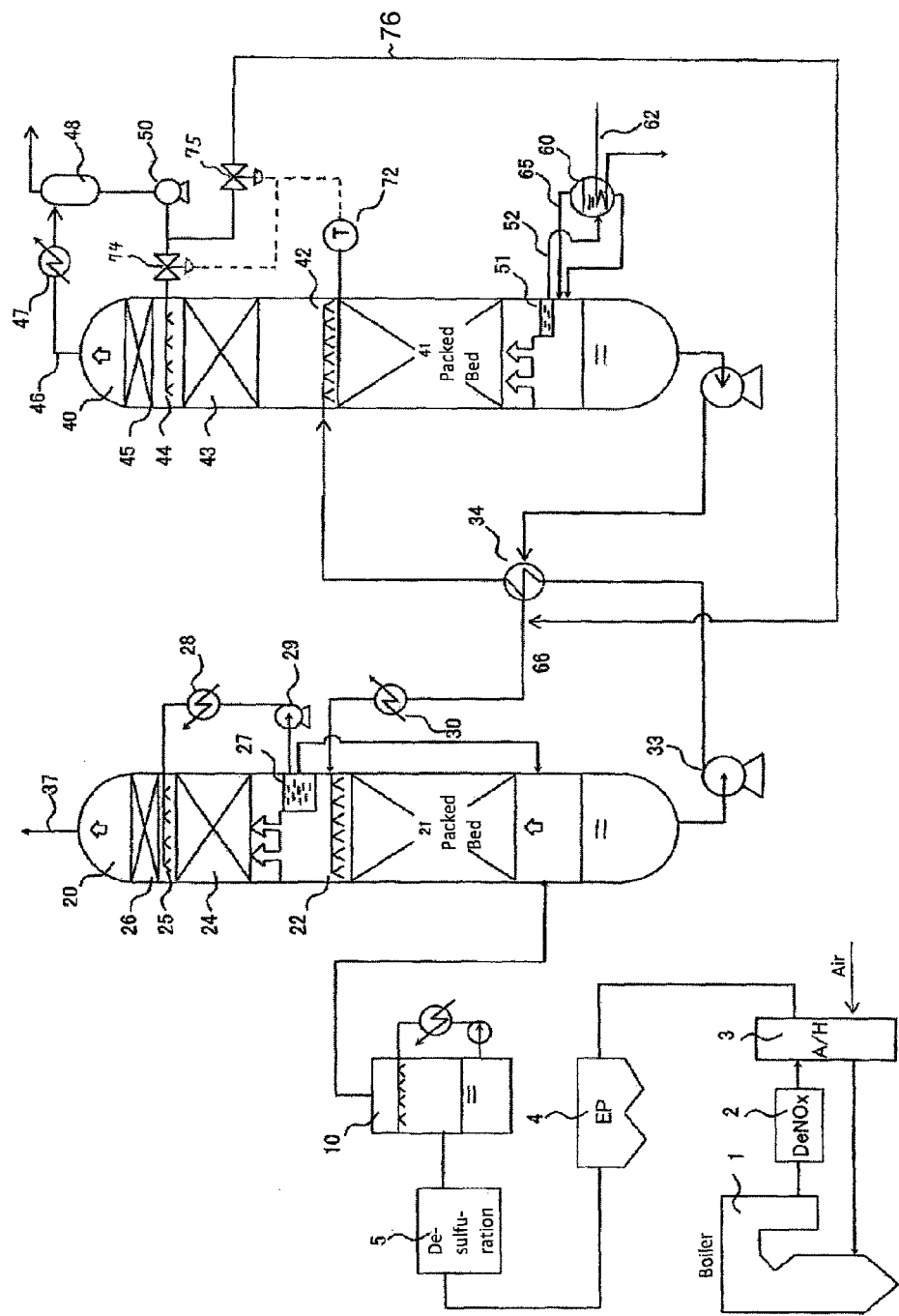

[FIG. 3]
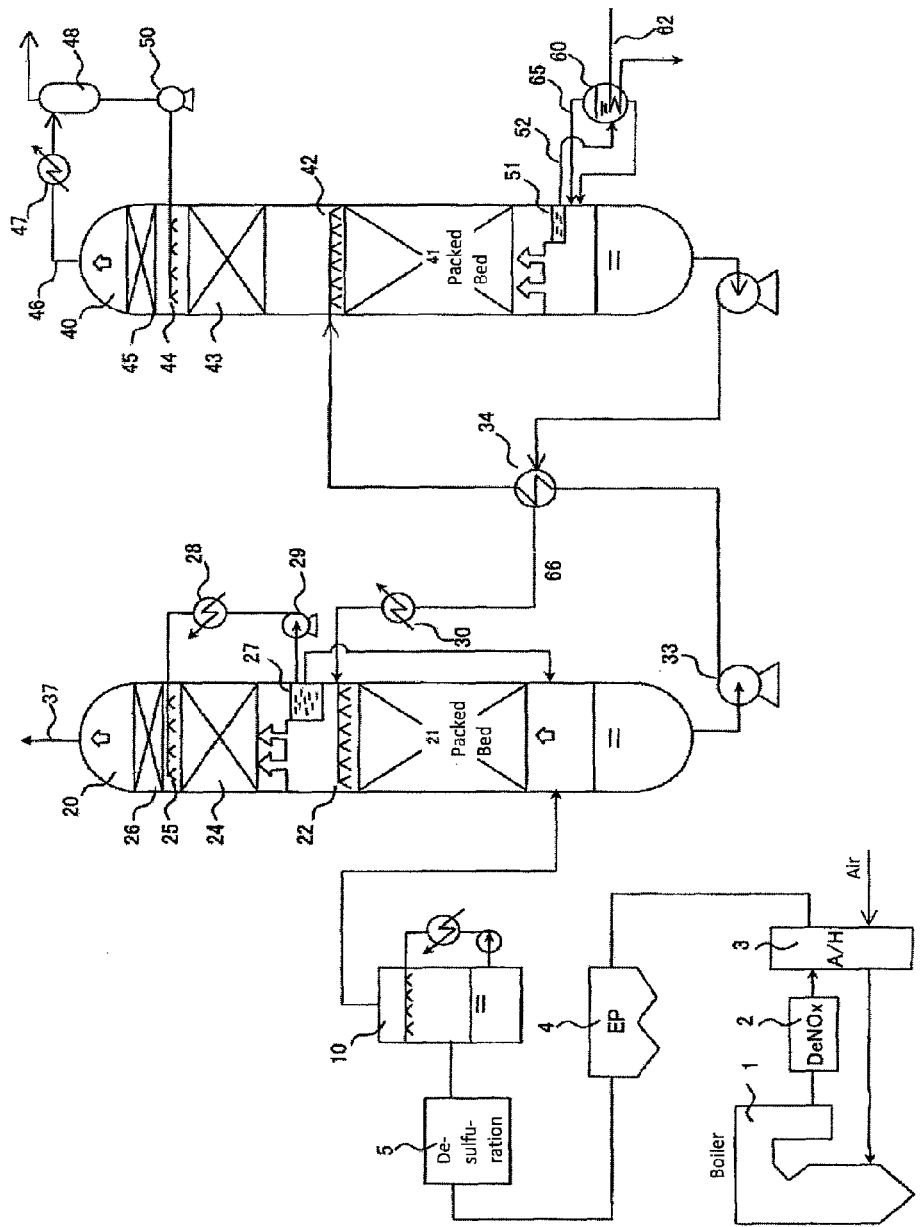
(PRIOR ART)

SYSTEM FOR CHEMICALLY ABSORBING CARBON DIOXIDE IN COMBUSTION EXHAUST GAS

TECHNICAL FIELD

The present invention relates to a system for chemically absorbing carbon dioxide ($CO_2$) from combustion exhaust gas generated in combustion equipment, such as a boiler. More specifically, the present invention relates to the structure of a regeneration column of a $CO_2$ chemical absorption system, and the system structure of peripheral devices of the regeneration column.

BACKGROUND ART

Thermal power generation facilities and boiler facilities generate a quantity of carbon dioxide as a result of burning a large amount of fuel, such as coal, heavy oil and the like. From the viewpoint of air pollution or global warming, many countries promote the regulation of large emissions of carbon dioxide (hereinafter abbreviated as "$CO_2$"). As a technique for separating and recovering $CO_2$, a chemical absorption method using an aqueous alkanolamine solution as a $CO_2$ absorbing liquid is widely known. FIG. 3 shows one embodiment of a power generation plant comprising a conventional $CO_2$ chemical absorption system. The power generation plant generally comprises at least boiler 1, denitration device 2, air heater 3, electrical dust collector 4, desulfurization device 5, prescrubber 10, $CO_2$ absorption column 20, regeneration column 40, and reboiler 60. Nitrogen oxides in combustion exhaust gas (e.g., produced from coal combustion) discharged from the boiler 1 are removed in the denitration device 2, and the combustion exhaust gas is then cooled to, for example, 120 to 170° C. by heat exchange with the air heater 3. After the exhaust gas passes through the air heater 3, dust is removed from the exhaust gas by the electrical dust collector 4, and sulfur oxides ($SO_2$) are removed by the desulfurization device 5. About tens of ppm of $SO_2$ may remain in the exhaust gas at the outlet of the desulfurization device 5; thus, in order to prevent deterioration of the $CO_2$ absorbing liquid in the $CO_2$ absorption column 20 by the remaining $SO_2$, the remaining $SO_2$ is reduced to as minimum as possible (e.g., 10 ppm or less) by the prescrubber 10, which is provided as a pretreatment facility in the $CO_2$ chemical absorption system.

The $CO_2$ absorption column 20 comprises at least packed bed 21, absorbing liquid feed part 22, water washing part 24, washing water feed part 25, mist eliminator 26, washing water collector 27, washing water cooler 28, and washing water pump 29. In the packed bed 21, $CO_2$ contained in the exhaust gas is brought into gas-liquid contact with the $CO_2$ absorbing liquid fed from the absorbing liquid feed part 22 in the upper portion of the $CO_2$ absorption column 20, and the $CO_2$ is absorbed by the $CO_2$ absorbing liquid. The heat generated during $CO_2$ absorption raises the temperature of the combustion exhaust gas from which $CO_2$ has been removed. In the water washing part 24, the combustion exhaust gas from which $CO_2$ has been removed is cooled, and mist entrained in the gas is removed. The washing water cooled by the washing water cooler 28 is used circularly by the washing water pump 29. The mist eliminator 26 disposed above the water washing part 24 removes the entrained mist that has not been removed in the water washing part. The combustion exhaust gas processed with the above removal treatment is discharged out of the system as treatment gas 37 ($CO_2$-removal gas).

The absorbing liquid that has absorbed $CO_2$ (also referred to as "$CO_2$-rich liquid") is extracted by a pump 33 from a liquid storage part in the lower portion of the absorption column 20, heated by a heat exchanger 34, and then sent to the regeneration column 40. In the regeneration column 40, the $CO_2$-rich liquid is fed to a packed bed 41 from a feed part 42. On the other hand, in the bottom of the regeneration column 40, vapor of the absorbing liquid is fed to the packed bed 41 from the reboiler 60 through a vapor feed pipe 65. In the packed bed 41, the rich liquid and the absorbing liquid vapor are brought into gas-liquid contact to desorb $CO_2$ gas from the $CO_2$-rich liquid. Since the desorbed $CO_2$ gas may entrain mist of the absorbing liquid, the mist is removed and the $CO_2$ gas is cooled in a water washing part 43. The entrained mist that has not been removed in the water washing part is removed by a mist eliminator 45 disposed above the water washing part 43. The $CO_2$ gas 46 from which the mist has been removed is discharged from the upper portion of the regeneration column 40. Thereafter, water vapor entrained in the $CO_2$ gas is cooled by a condenser 47, and separated into gas and condensed water (reflux water) by a reflux water drum 48. The $CO_2$ gas is introduced into a $CO_2$-liquefying facility (not shown). The condensed water (reflux water) is fed to a washing water feed part 44 by a drain pump 50.

On the other hand, the $CO_2$ absorbing liquid from which $CO_2$ has been desorbed (also referred to as "lean liquid") is stored in a liquid collector 51 in the regeneration column. A part of the $CO_2$ absorbing liquid is sent to the reboiler 60 through a reboiler liquid feed pipe 52. The reboiler 60 is provided with a heat exchanger tube, etc., therein. The $CO_2$ absorbing liquid is indirectly heated by water vapor 62 fed through a water vapor feed pipe, thereby generating vapor of the absorbing liquid in the reboiler 60. The absorbing liquid vapor is fed to the regeneration column 40 through the absorbing liquid vapor feed pipe 65 mentioned above. The water vapor used in the reboiler 60 is condensed in the heat exchanger tube, and collected as drain water. The lean liquid stored in the liquid storage part at the bottom of the regeneration column 40 is cooled by the heat exchanger 34 and a cooler 30 through a liquid extraction pipe 66, and then fed to the $CO_2$ absorption column.

In the conventional regeneration column 40, the reflux water returned to the regeneration column 40 from $CO_2$ separation drum (reflux water drum) 48 is brought into direct contact with the gas in the water washing part 43, and then added dropwise to the packed bed 41 to condense a part of the absorbing liquid vapor fed from the reboiler 60. This is uneconomical in that the reflux water, which is not essentially necessary to be heated, is unnecessarily heated.

SUMMARY OF INVENTION

Technical Problem

In the above conventional technique, the reflux water after cooling the gas is brought into direct contact with the absorbing liquid vapor fed from the reboiler in the packed bed; thus, a part of the thermal energy from the reboiler, which should essentially be used for the $CO_2$ desorption reaction, was used to heat the reflux water.

An object of the present invention is to reduce energy consumption in the entire $CO_2$ chemical absorption system by effectively using the absorbing liquid vapor fed from the reboiler, while maintaining the gas cooling capacity and amine mist removal capacity inherent in the reflux water.

Solution to Problem

The invention claimed in the present application to achieve the above object is as follows.

[1] A carbon dioxide ($CO_2$) chemical absorption system comprising:
- a $CO_2$ absorption column for separating $CO_2$ from combustion exhaust gas by absorbing the $CO_2$ in the combustion exhaust gas with a $CO_2$ absorbing liquid mainly composed of an aqueous alkanolamine solution;
- a regeneration column for regenerating the $CO_2$ absorbing liquid by desorbing $CO_2$ gas from the $CO_2$ absorbing liquid that has absorbed $CO_2$;
- a condenser for condensing water vapor entrained in the desorbed $CO_2$ gas discharged from the top of the regeneration column, thereby obtaining reflux water;
- a pipe for returning all or part of the reflux water obtained by the condenser to the top of the regeneration column, and dispersing the reflux water in the regeneration column;
- a collection plate for collecting the reflux water dispersed in an upper portion of a packed bed in the regeneration column;
- a pipe for sending the regenerated $CO_2$ absorbing liquid from the bottom of the regeneration column to the top of the absorption column; and
- a pipe for joining the reflux water collected by the collection plate into the pipe for sending the regenerated $CO_2$ absorbing liquid.

[2] A carbon dioxide ($CO_2$) chemical absorption system comprising:
- a $CO_2$ absorption column for separating $CO_2$ from combustion exhaust gas by absorbing the $CO_2$ in the combustion exhaust gas with a $CO_2$ absorbing liquid mainly composed of an aqueous alkanolamine solution;
- a regeneration column for regenerating the $CO_2$ absorbing liquid by desorbing $CO_2$ gas from the $CO_2$ absorbing liquid that has absorbed $CO_2$;
- a condenser for condensing water vapor entrained in the desorbed $CO_2$ gas discharged from the top of the regeneration column, thereby obtaining reflux water;
- a pipe for returning a part of the reflux water obtained by the condenser to the top of the regeneration column, and dispersing the reflux water in the regeneration column;
- a means for measuring the temperature of an upper portion of a packed bed in the regeneration column, and controlling the flow rate of the reflux water dispersed in the regeneration column so that the temperature is a predetermined value;
- a pipe for sending the regenerated $CO_2$ absorbing liquid from the bottom of the regeneration column to the top of the absorption column; and
- a pipe for joining the remaining reflux water obtained by the condenser into the pipe for sending the regenerated $CO_2$ absorbing liquid.

[3] A method of carbon dioxide ($CO_2$) chemical absorption comprising the steps of:
- separating $CO_2$ from combustion exhaust gas by absorbing the $CO_2$ in the combustion exhaust gas with a $CO_2$ absorbing liquid mainly composed of an aqueous alkanolamine solution;
- regenerating the $CO_2$ absorbing liquid by desorbing $CO_2$ gas from the $CO_2$ absorbing liquid that has absorbed $CO_2$;
- condensing water vapor entrained in the desorbed $CO_2$ gas, thereby obtaining reflux water;
- dispersing all or part of the reflux water obtained by the condensation step to the $CO_2$ gas desorbed in the regeneration step to cool the $CO_2$ gas and remove absorbing liquid mist entrained in the $CO_2$ gas;
- collecting the dispersed reflux water to prevent the dispersed reflux water from being involved in the regeneration step; and
- mixing the collected reflux water with the regenerated $CO_2$ absorbing liquid.

[4] A method of carbon dioxide ($CO_2$) chemical absorption comprising the steps of:
- separating $CO_2$ from combustion exhaust gas by absorbing the $CO_2$ in the combustion exhaust gas with a $CO_2$ absorbing liquid mainly composed of an aqueous alkanolamine solution;
- regenerating the $CO_2$ absorbing liquid by desorbing $CO_2$ gas from the $CO_2$ absorbing liquid that has absorbed $CO_2$;
- condensing water vapor entrained in the desorbed $CO_2$ gas, thereby obtaining reflux water;
- dispersing a part of the reflux water obtained by the condensation step to the $CO_2$ gas desorbed in the regeneration step to cool the $CO_2$ gas and remove absorbing liquid mist entrained in the $CO_2$ gas;
- measuring the temperature of the $CO_2$ gas desorbed in the regeneration step, and controlling the flow rate of the dispersed reflux water so that the temperature is a predetermined value; and
- mixing the remaining reflux water obtained by the condensation step with the regenerated $CO_2$ absorbing liquid.

Advantageous Effects of Invention

The present invention can reduce the absorbing liquid vapor that should be fed from the reboiler 40 to the regeneration column 20; consequently, this can reduce the amount of water vapor fed from the plant vapor system to the reboiler. That is, upon reduction in the amount of reflux water added dropwise to the packed bed for $CO_2$ desorption, the heat of the absorbing liquid vapor fed from the reboiler is only applied to the $CO_2$-rich liquid; consequently, this can reduce the amount of heat used to heat the reflux water. Therefore, when the $CO_2$ chemical absorption system of the present invention is installed, the energy loss in the entire power plant can be reduced.

BRIEF DESCRIPTION OF DRAWINGS

FIG. 1 an apparatus flow diagram showing one embodiment of a $CO_2$ chemical absorption system in the present invention.

FIG. 2 an apparatus flow diagram showing another embodiment of a $CO_2$ chemical absorption system in the present invention.

FIG. 3 an apparatus flow diagram showing the structure of a conventional $CO_2$ chemical absorption system.

DESCRIPTION OF EMBODIMENTS

FIG. 1 shows one embodiment of the $CO_2$ chemical absorption system according to the present invention. The difference from the conventional system shown in FIG. 3 is that a reflux water collection plate 70 is provided directly below the water washing part packed bed 43 in the regeneration column 40 so that the liquid collected by the reflux water collection plate 70 is returned to the pipe 66 from the regeneration column 40 toward the absorption column 20.

The absorbing liquid vapor fed from the reboiler 60 passes through an absorbing liquid collection plate 51, and is sent to the packed bed 41. In the packed bed 41, the absorbing liquid vapor and a $CO_2$-rich liquid are brought into direct contact to desorb $CO_2$ gas from the $CO_2$-rich liquid. Water vapor entrained in the desorbed $CO_2$ gas passes through the reflux water collection plate 70 and is fed to the water washing part 43, wherein the water vapor is cooled and amine mist is removed. The mist is further removed by the mist eliminator 45, and the gas is discharged from the regeneration column 40. The discharged gas is cooled by the condenser 47, and separated into gas and condensed water. In the reflux water drum 48, the $CO_2$ gas is sent out of the system, and the condensed water (reflux water) is returned to the system. The reflux water separated in the reflux water drum 48 passes through the pump 50, and is dispersed from the water washing feed part 44 in the regeneration column. The reflux water is used to cool the gas and to remove the amine mist in the water washing part 43. Thereafter, the reflux water is collected by the collection plate 70 provided above the packed bed 41 (preferably in a position higher than the feed part 42). The collected reflux water is joined to the absorbing liquid in the pipe 66 located before the cooler 30. The water balance of the entire system is maintained in this manner. Here, a pipe 71 extending from the reflux water collection plate 70 to the joining part of the reflux water and the lean liquid is optionally provided with a pump 73, a resister (e.g., a valve 74), and a liquid storage drum. In this embodiment, the reflux water and the absorbing liquid are joined before they reach the cooler 30; however, the reflux water may be joined to the absorbing liquid at any place in a lean liquid line extending from the outlet of the reboiler 60 to the inlet of the absorption column 20.

FIG. 2 shows another embodiment of the $CO_2$ chemical absorption system according to the present invention. The differences from the conventional system shown in FIG. 3 are that as a feed pipe for the reflux water from the $CO_2$ collection drum 48, a line 76 is provided, in addition to the feed line to the water washing part packed bed 43, so as to feed the reflux water to the pipe 66 before the cooler 30 without passing through the packed bed 41; and that a thermometer 72 is provided in the upper portion of the packed bed 41, and valves 74 and 75 are adjusted to control the amount of reflux water fed to the line 76 and the water washing feed part 44 so that the temperature measured by the thermometer is a predetermined value.

The absorbing liquid vapor fed from the reboiler 60 passes through the absorbing liquid collection plate 51, and is sent to the packed bed 41. In the packed bed 41, the absorbing liquid vapor and a $CO_2$-rich liquid are brought into direct contact to desorb $CO_2$ gas from the $CO_2$-rich liquid. Water vapor entrained in the desorbed $CO_2$ gas is fed to the water washing part 43, wherein the water vapor is cooled and amine mist is removed. The mist is further removed by the mist eliminator 45, and the gas is discharged from the regeneration column 40. The discharged gas is cooled by the condenser 47, and separated into gas and condensed water. In the reflux water drum 48, the $CO_2$ gas is sent out of the system, and the condensed water (reflux water) is returned to the system. In this case, the liquid temperature is measured by the thermometer 72 provided in the upper portion of the packed bed 41, and the amount of reflux water dispersed from the water washing feed part 44 is controlled so that the liquid temperature is 100° C., for example. The excess reflux water is returned to the absorbing liquid line 66 via the line 76, without passing through the packed bed 41. The water balance of the entire system is maintained in this manner. Here, the pipe extending from the reflux water drum 48 to the water washing feed part 44, and the pipe 76 extending from the reflux water drum 48 to the joining part of the reflux water and the lean liquid are optionally provided with a resister (e.g., a valve) and a liquid storage drum. In this embodiment, the reflux water and the absorbing liquid are joined before they reach the cooler 30; however, the reflux water may be joined to the absorbing liquid at any place in the lean liquid line extending from the outlet of the reboiler 60 to the inlet of the absorption column 20.

Although a collection plate 42 is not provided in the embodiment shown in FIG. 2, the collection plate 42 may be further provided, if necessary, as in the embodiment shown in FIG. 1, so that the reflux water collected by the collection plate 42 and the reflux water the flow rate of which has been controlled by the valve 75 may be joined to the lean liquid.

REFERENCE SIGNS LIST

20: Absorbing liquid
30: Cooler
40: Regeneration column
41: Packed bed
43: Water washing part packed bed
51: Absorbing liquid collection plate
60: Reboiler
70: Reflux water collection plate
72: Thermometer
74, 75: Valves

The invention claimed is:

1. A carbon dioxide ($CO_2$) chemical absorption system comprising:
   a $CO_2$ absorption column for separating $CO_2$ from combustion exhaust gas by absorbing the $CO_2$ in the combustion exhaust gas with a $CO_2$ absorbing liquid mainly composed of an aqueous alkanolamine solution;
   a regeneration column for regenerating the $CO_2$ absorbing liquid by desorbing $CO_2$ gas from the $CO_2$ absorbing liquid that has absorbed $CO_2$, wherein the regeneration column comprises a packed bed, a water washing part over the packed bed and a reboiler, and the $CO_2$ absorbing liquid that has absorbed $CO_2$ is fed to a top portion of the packed bed;
   a condenser for condensing water vapor entrained in the desorbed $CO_2$ gas discharged from the top of the regeneration column, thereby obtaining reflux water;
   a pipe for returning all or part of the reflux water obtained by the condenser to the top of the regeneration column, and for dispersing the reflux water to the water washing part in the regeneration column;
   a collection plate for collecting the reflux water dispersed to the water washing part in the regeneration column, and for preventing the dispersed reflux water from flowing into the packed bed;
   a pipe for sending the regenerated $CO_2$ absorbing liquid from the bottom of the regeneration column to the top of a packed bed in the absorption column; and
   a pipe for joining the reflux water collected by the collection plate into the pipe for sending the regenerated $CO_2$ absorbing liquid.

2. A carbon dioxide ($CO_2$) chemical absorption system comprising:
- a $CO_2$ absorption column for separating $CO_2$ from combustion exhaust gas by absorbing the $CO_2$ in the combustion exhaust gas with a $CO_2$ absorbing liquid mainly composed of an aqueous alkanolamine solution;
- a regeneration column for regenerating the $CO_2$ absorbing liquid by desorbing $CO_2$ gas from the $CO_2$ absorbing liquid that has absorbed $CO_2$, wherein the regeneration column comprises a packed bed, a water washing part over the packed bed and a reboiler, and the $CO_2$ absorbing liquid that has absorbed $CO_2$ is fed to a top portion of the packed bed;
- a condenser for condensing water vapor entrained in the desorbed $CO_2$ gas discharged from the top of the regeneration column, thereby obtaining reflux water;
- a pipe for returning a part of the reflux water obtained by the condenser to the top of the regeneration column, and for dispersing the reflux water to the water washing part in the regeneration column;
- an instrument for measuring the temperature in the top portion of the packed bed in the regeneration column, and for controlling the flow rate of the reflux water dispersed to the water washing part in the regeneration column so that the temperature is a predetermined value;
- a pipe for sending the regenerated $CO_2$ absorbing liquid from the bottom of the regeneration column to the top of a packed bed in the absorption column; and
- a pipe for joining the remaining reflux water obtained by the condenser into the pipe for sending the regenerated $CO_2$ absorbing liquid.

* * * * *